(12) United States Patent
Graßl

(10) Patent No.: US 11,458,850 B2
(45) Date of Patent: Oct. 4, 2022

(54) WALLBOX SYSTEM WITH CHARGING INTERFACE

(71) Applicant: AUDI AG, Ingolstadt (DE)

(72) Inventor: Tobias Graßl, Denkendorf (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 17/038,485

(22) Filed: Sep. 30, 2020

(65) Prior Publication Data
US 2021/0094429 A1    Apr. 1, 2021

(30) Foreign Application Priority Data

Sep. 30, 2019 (DE) .......................... 102019126266.6

(51) Int. Cl.
*B60L 53/16* (2019.01)
*B60L 53/18* (2019.01)

(52) U.S. Cl.
CPC ............... *B60L 53/16* (2019.02); *B60L 53/18* (2019.02)

(58) Field of Classification Search
CPC .................................. B60L 53/16; B60L 53/18
USPC ......................................................... 320/109
See application file for complete search history.

(56) References Cited

U.S. PATENT DOCUMENTS

| | | | | |
|---|---|---|---|---|
| 10,391,870 B2* | 8/2019 | Gotz | ................. | B60L 53/62 |
| 11,322,968 B2* | 5/2022 | Ruppert | ............... | H02J 7/0013 |
| 2011/0145141 A1* | 6/2011 | Blain | .................. | B60L 3/04 705/39 |
| 2013/0057210 A1* | 3/2013 | Nergaard | ............. | H02J 7/0013 320/109 |
| 2013/0069592 A1* | 3/2013 | Bou | ...................... | H02J 7/007 320/109 |
| 2013/0342165 A1* | 12/2013 | Brimacombe | ........ | B60L 53/305 320/109 |
| 2014/0253034 A1* | 9/2014 | Kurimoto | .............. | B60L 53/30 320/109 |
| 2014/0320083 A1* | 10/2014 | Masuda | ............... | H01M 10/44 320/109 |
| 2015/0251547 A1* | 9/2015 | Nonomura | ............. | H02J 7/007 320/109 |
| 2016/0176305 A1* | 6/2016 | James | ................... | B60L 53/51 307/26 |
| 2016/0193932 A1* | 7/2016 | Vaghefinazari | ....... | B60L 53/665 320/109 |
| 2016/0250942 A1* | 9/2016 | Shizuno | ............... | H01M 10/44 320/106 |
| 2020/0406777 A1* | 12/2020 | Nguyen | ................. | B60L 58/18 |

FOREIGN PATENT DOCUMENTS

| | | | | |
|---|---|---|---|---|
| CA | 2786378 A1 * | 7/2011 | ............ | B60L 3/0069 |
| DE | 10 2013 200 949 A1 | 7/2014 | | |
| DE | 10 2017 209 128 A1 | 12/2018 | | |
| DE | 10 2018 004 625 A1 | 2/2019 | | |
| DE | 10 2017 221 762 A1 | 6/2019 | | |

* cited by examiner

*Primary Examiner* — Suresh Memula
(74) *Attorney, Agent, or Firm* — Seed Intellectual Property Law Group LLP

(57) ABSTRACT

A wallbox system for charging an electric vehicle comprises a wallbox, wherein the wallbox comprises at least one charging interface, wherein the charging interface is a socket, for example a Type 2 socket, or a cable outlet with a cable and a plug.

16 Claims, 2 Drawing Sheets

WALLBOX SYSTEM WITH CHARGING INTERFACE

BACKGROUND

Technical Field

Embodiments of the present invention relate to wallbox systems, for charging an electric vehicle, comprising wallboxes.

Description of the Related Art

In the prior art, charging systems in the form of wallboxes are known.

Accordingly, a charging process and a charging device for charging a first and a second electrically-operated vehicle are known from document DE 10 2017 221 762 A1. This charging device is equipped with a plurality of charging interfaces at which the electrically operated vehicles are charged sequentially.

DE 10 2018 004 625 A1 discloses a charging station for the electrical charging of energy storage systems of motor vehicles. This charging station is designed as a central energy-supply device which has a plurality of charging interfaces which can be operated in parallel and are arranged remotely from the charging station.

DE 10 2013 200 949 A1 discloses a charging device for charging a number of electric vehicles and a charging station. This charging device uses a plurality of interface modules to expand a number of charging interfaces which are supplied with energy by the charging device and are used simultaneously.

In order to make the process of charging electric vehicles more convenient at home, so-called wallboxes are currently being offered on the market. On AC (alternating current) wallboxes there is either a plug interface allowing a MODE 3 charging (as that term is used in relevant International Electrotechnical Commission or other related technical standards) or a permanently connected charging cable with charging plug. The customer then only has to plug in the charging cable at the vehicle and possibly, depending on the design, at the wallbox. A MODE 2 charging cable (as that term is used in relevant International Electrotechnical Commission or other related technical standards) is no longer required. There are also DC (direct current) wallboxes with a permanently connected cable for MODE 4 DC charging (as that term is used in relevant International Electrotechnical Commission or other related technical standards).

Generally, a wallbox on account of its size must be mounted on a wall near an electric vehicle. In addition, a supply cable must be routed to the wallbox for the connection to the wallbox. All these requirements severely limit the possible "locations" of the wallbox in a garage or in a carport. It is particularly challenging if two parking spaces (for example, a double garage) have to be served via one wallbox or two electric vehicles each with a different position of the charging socket.

BRIEF SUMMARY

It is, therefore, an object of embodiments of the present invention to provide a wallbox for home use that supports variable charging positions of an electric vehicle.

The subject-matter of embodiments of the present invention is a wallbox system for charging an electric vehicle, comprising at least one wallbox. For example, the wallbox is arranged in a garage or a carport. The wallbox is configured to provide a charging current for charging the electric vehicle. Optionally, the wallbox can be coupled to a domestic power plant.

According to embodiments of the invention, the wallbox comprises at least one charging interface, wherein the charging interface is, for example, a socket or a cable outlet with a cable and a plug. The wallbox is designed as a DC wallbox, which allows a direct-current charging of the electric vehicle or as an AC wallbox, which allows an alternating-current charging of the electric vehicle. Optionally, the socket is a Type 2 socket. However, it can also be a socket for a Type 1 plug or another type of plug. The charging interfaces can be surface mounted or flush mounted. The charging interfaces can still be installed later on. The charging interfaces are generally permanently connected to the wallbox via suitable supply cables or lines. This offers the advantage that the wallbox can be positioned as desired in the garage or in the carport.

The advantage of the wallbox system according to some embodiments of the invention is that the relatively large wallbox can be positioned as desired in a charging location, for example in the carport, and does not have to be mounted in the immediate vicinity of the electric vehicle.

In design, the wallbox is formed and configured in a sub-distribution unit. Installation of the individual components of the wallbox in a sub-distribution unit can thus be implemented, wherein lines or supply cables are formed between the charging interfaces and the wallbox installed in the sub-distribution unit. As a rule, the wallbox system is configured to be operable via an application or directly via an operating device on the wallbox. Alternatively, the wallbox system can be operated at at least one charging interface, for example via an operating unit which is formed at the charging interface. As a rule, the operating unit is a charging start button.

The integration of the wallbox into a sub-distribution unit offers the advantage that a modified wallbox can be created, in which, unlike a classic wallbox, the individual components can be installed in a sub-distribution unit, for example in a basement. Thanks to the modified wallbox, a plurality of charging interfaces can easily be created in different positions, at different locations. This increases flexibility and eliminates the need for long supply cables between the vehicle and the wallbox.

Furthermore, it is possible to connect a plurality of electric vehicles to a modified wallbox simultaneously; these can then be charged automatically in parallel or at least sequentially. The costs for a charging interface are significantly lower in this case than for another separate wallbox, whereby the total costs for a plurality of charging points are significantly lower, since only one wallbox is required.

In one development, the charging interface is connected to a combined signal and power cable or to two separate signal and power cables. The power cable or the combined signal and power cable is set up to carry an AC or DC current, and the signal cable or the combined signal and power cable is set up to provide a bidirectional communication link between the wallbox and the electric vehicle. The lines or supply cables are thus designed as signal and power cables.

In one development, the signal cable of a charging interface is connected directly to the wallbox. The communication interface is connected to the wallbox directly from the charging interface. This makes it possible to detect whether or not a vehicle is connected to the respective charging interface. This information is needed in order for the wallbox to be able to control a situation-related charging of electric vehicles that are present.

In a further development, the wallbox comprises at least two, in particular three, charging interfaces which are formed separately from each other. For example, in a carport comprising two side walls and one end wall, one charging interface can be formed on each side wall and at least one charging interface can be formed on the end wall of the carport. This offers the advantage that a plurality of charging interfaces around an electric vehicle parked in the garage or carport can be provided for charging the electric vehicle. As a result, it is not necessary for the electric vehicle to be parked directly against or close to the wallbox or to be parked in the carport with a side of the electric vehicle having the charging socket facing the wallbox.

In a further development, the wallbox optionally comprises at least one direct charging interface. The direct charging interface can optionally be used in addition to the charging interfaces directly at the wallbox. The direct charging interface is typically formed fixedly on the wallbox, wherein the direct charging interface may comprise a charging cable or cable with a plug. In an alternative development, the direct charging interface is set up to receive a charging cable with a charging plug.

In design, the wallbox comprises a switching unit which is configured to set or control a charging sequence of the charging interfaces on the basis of a parametrizable logic. The switching unit is generally formed in the wallbox. Alternatively, the wallbox is configured to connect to an external switching unit. For example, the wallbox can be coupled to a switching unit of a home power plant.

In a further development, the switching unit is configured to charge at least two electric vehicles in parallel during an AC charging of the electric vehicle through the wallbox, the power being distributed to the respective electric vehicles.

In the case of a parallel charging of at least two electric vehicles, the charging interfaces are optionally set up to be automatically de-energizable for safety reasons. Optionally, the charging interfaces have at least one type of shutter (a further contact protection) or charging contactors or have a locking of unused charging interfaces so that these cannot be opened. This prevents the contacts of an "open" charging interface from being touched during charging at a parallel charging interface. A parallel circuit of the charging interfaces reduces a required outlay on line cables.

In an alternative embodiment, the switching unit is configured to sequentially charge electric vehicles connected to the charging interfaces during an AC charging of the electric vehicle through the wallbox. Here the charging interfaces are actuated or operated sequentially by the switching unit, which means that, for example, a first electric vehicle is first charged up to a preset charging target and then a second electric vehicle is charged up to a preset charging target. This offers the advantage that, for example, a vehicle can first be fully charged in order to be able to cover a greatest possible range as quickly as possible with the electric vehicle before a second electric vehicle is charged.

In an alternative development, the switching unit and the current converter are configured to charge at least two electric vehicles in parallel during a DC charging of the electric vehicle through the wallbox, the power being distributed to the respective electric vehicles. A parallel charging of at least two electric vehicles during a direct current charging can be secured only by a special design of the wallbox or of the power section.

This is the case, for example, if two AC/DC converters are formed in the wallbox and used, wherein the AC/DC converters can be connected in parallel or serially by the switching unit. Other circuit arrangements of the switching unit of the wallbox or of the power section would also be conceivable, e.g., two parallel-switched DC/DC converters downstream of the AC/DC converter. In this case, it must be ensured that a (short-term) parallel connection of two vehicle batteries can be safely excluded.

In an alternative development, the switching unit is configured, in the case of a DC charging of the electric vehicle through the wallbox, to sequentially charge electric vehicles connected to the charging interfaces. As a rule, the switching unit is configured to switch the charging interfaces on or off, so that only one electric vehicle is connected at any one time to the wallbox during the charging process. As a result, this can optionally take place via the DC charging contactors in the electric vehicle.

DETAILED DESCRIPTION

Figure 1:
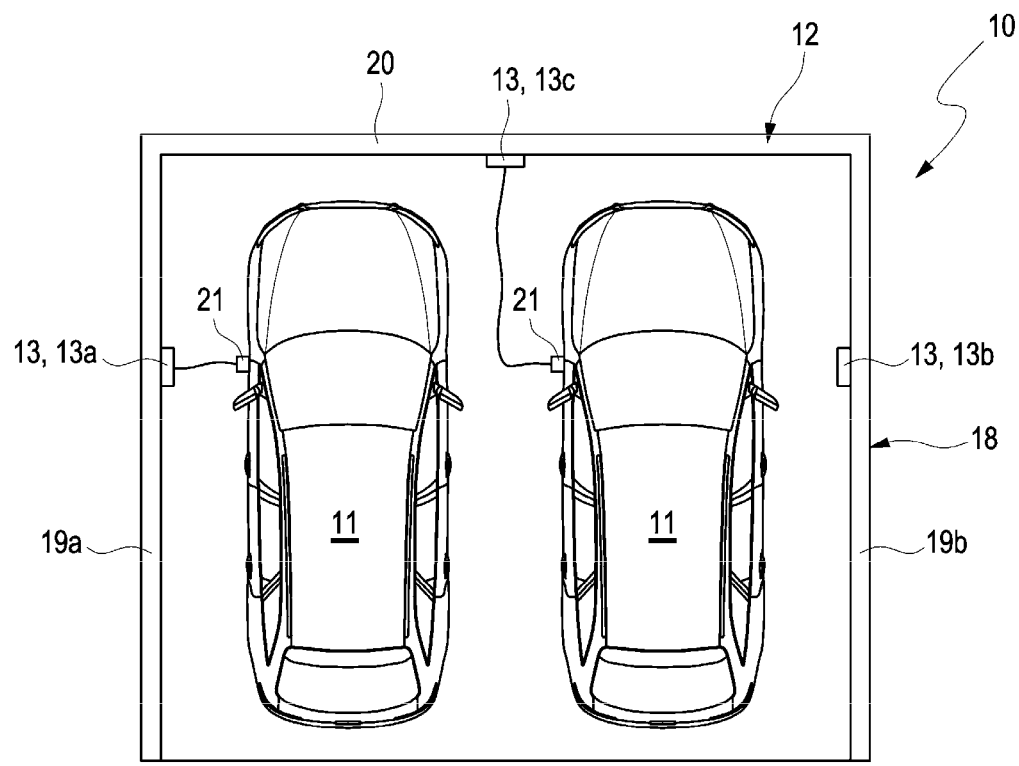
FIG. 1 illustrates a schematic representation of an embodiment of a wallbox system.

FIG. 1 shows a schematic representation of an embodiment of a wallbox system 10. In FIG. 1, a carport or a garage 18 for an electric vehicle 11 is indicated. In the present embodiment, the carport or garage 18 includes two electric vehicles 11 parked side by side in the garage or carport 18, respectively.

The wallbox system 10 in the present embodiment comprises three charging interfaces 13a, 13b and 13c, generally indicated by 13, arranged in the carport or garage 18. The carport or garage 18 has at least two side walls 19a, 19b and one end wall 20, at least one of the charging interfaces 13a, 13b, 13c being arranged in a side wall 19a, 19b and in the end wall 20.

In the present embodiment, the charging interface 13a is formed in the side wall 19a, the charging interface 13b is formed in the side wall 19b and the charging interface 13c is formed in the end wall 20. Each of the charging interfaces 13a, 13b and 13c can be designed as, e.g., a Type 2 socket or a cable outlet with a cable and a plug (e.g., in accordance with VDE-AR-E 2623-2-2 plug specifications or any other relevant International Electrotechnical Commission or other related technical standards, such as IEC 62196). Each of the charging interfaces 13a, 13b and 13c is connectable to the wallbox 12 via a combined signal and power cable—not shown—or via two separate signal and power cables. As a result, the charging interfaces 13a, 13b and 13c can be directly connectable to the wallbox 12 and carry an alternating current (AC) or a direct current (DC) and provide communication between the wallbox 12 and the respective electric vehicle 11. Optionally, in the present embodiment, the charging interface 13c may be configured as a charging interface integrated into the wallbox 12.

In the embodiment shown, the two electric vehicles 11 each have their own charging socket 21 which is formed on an outer wall of the electric vehicle at the level of the driver-side front tire. In this case, by the embodiment of the wallbox system 10 with a plurality of charging interfaces 13a, 13b, 13c, it is possible to charge both electric vehicles 11 in parallel or sequentially via short power cables.

In the present embodiment, a first electric vehicle 11 is charged via the charging interface 13a and a second electric vehicle 11 via the third charging interface 13c because the distance between the charging socket 21 of the electric vehicle 11 and the charging interface 13c is shorter than the distance between the charging socket 21 of the electric vehicle 11 and the charging interface 13b.

Figure 2:
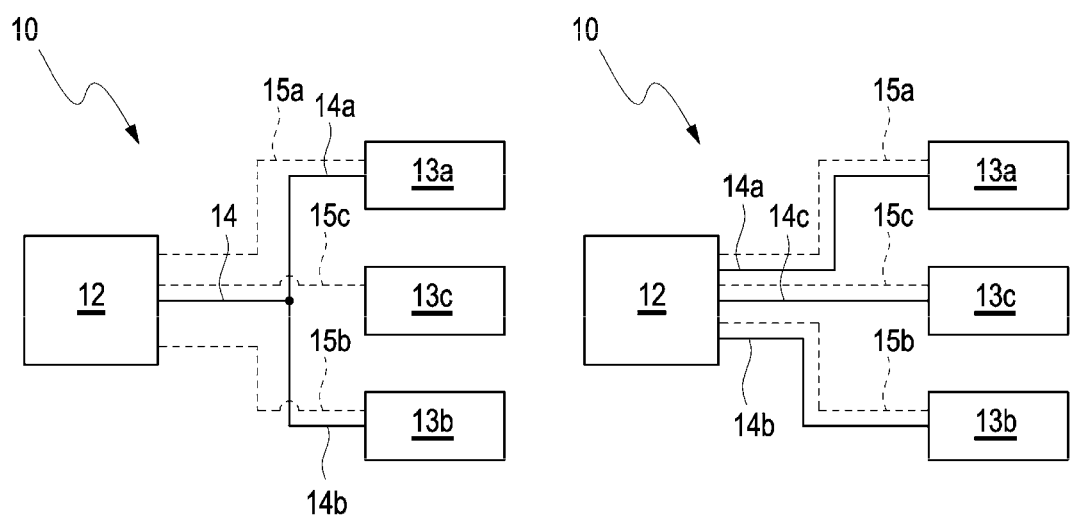
FIG. 2a illustrates a schematic representation of the embodiment shown in FIG. 1 with an AC wallbox.
FIG. 2b illustrates a schematic representation of the embodiment shown in FIG. 1 with a DC wallbox.

FIG. 2a shows a schematic representation of the embodiment shown in FIG. 1 of the wallbox system 10 with an AC wallbox 12. In the embodiment shown in FIG. 2a, the wallbox 12 is designed as an alternating-current wallbox (AC wallbox). In this case, the wallbox system 10 comprises the three charging interfaces 13a, 13b, 13c which are connected to the wallbox 12 via a respective signal cable 15a, 15b, 15c. A power cable 14 starting from the wallbox 12 splits into two power cables 14a, 14b, which are each connected to a charging interface 13a, 13b. The charging interfaces 13a and 13b are thus configured or arranged in parallel, which simplifies the cabling effort for the signal and power cables 14a, 14b, 15a, 15b. The charging interface 13c is connected to the wallbox 12 via a signal cable 15c. However, no direct power cable is set up between the charging interface 13c and the wallbox 12. Optionally, the charging interface 13c is configured for automatic, wireless charging. Optionally, a switching unit, not shown, is configured to control a charging sequence of the individual charging interfaces 13a, 13b, 13c.

The three signal cables 15a, 15b, 15c are in each case designed as communication links between the wallbox 12 and a respective charging interface 13a, 13b, 13c. The signal cables 15a, 15b, 15c are always connected directly to a respective charging interface 13a, 13b, 13c in order to detect an occupancy of a charging interface 13a, 13b, 13c by an electric vehicle (not shown).

FIG. 2b shows a schematic representation of the embodiment shown in FIG. 1 of the wallbox system 10 with a DC wallbox 12. In the embodiment shown in FIG. 2b, the wallbox 12 takes the form of a direct-current wallbox (DC wallbox). In the embodiment shown, the wallbox system 10 comprises three charging interfaces 13a, 13b, 13c connected to the wallbox 12 via three signal and power cables 14a, 14b, 14c and 15a, 15b, 15c, respectively.

In general, it is conceivable that the charging interfaces 13a, 13b, 13c of the DC wallbox 12 be arranged in parallel like the embodiment of the AC wallbox shown in FIG. 2a and connected to the wallbox 12 via the signal and power cables 14a, 14b, 14c, 15a, 15b, 15c. In this case, it must be ensured that in each case only one vehicle has closed the DC charging contactors and thus a parallel connection of two vehicle batteries can be safely excluded. Optionally, a switching unit, not shown, is set up to control a charging sequence of the charging of the individual charging interfaces 13a, 13b, 13c.

The present embodiment comprises three signal cables 15a, 15b, 15c, each designed as communication links between the wallbox 12 and a respective charging interface 13a, 13b, 13c. Here the signal cables 15a, 15b, 15c are always connected directly to a respective charging interface 13a, 13b, 13c in order to detect an occupancy of a charging interface 13a, 13b, 13c by an electric vehicle (not shown).

Figure 3:
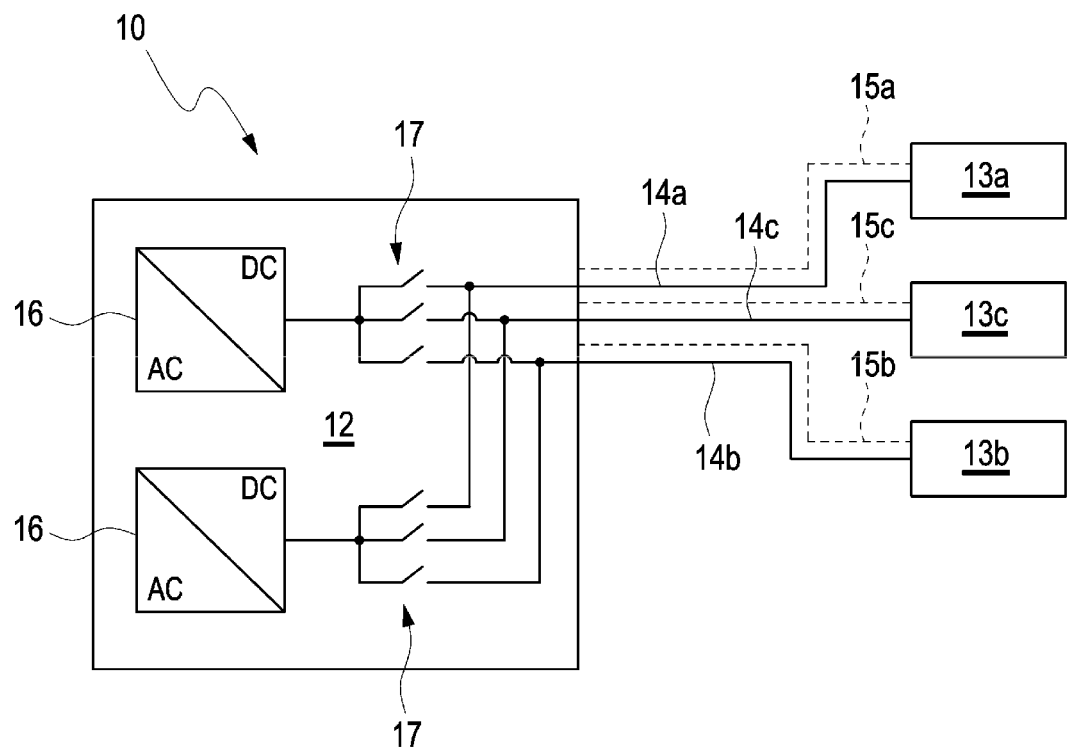
FIG. 3 illustrates a schematic representation of an embodiment of a wallbox system with a DC wallbox and AC/DC converters.

FIG. 3 shows a schematic representation of an embodiment of the wallbox system 10 with a DC wallbox 12 and two AC/DC converters 16.

The wallbox system 10 comprises three charging interfaces 13a, 13b, 13c, the two AC/DC converters 16 being connectable in each case to the three charging interfaces 13a, 13b, 13c.

The wallbox system 10 comprises three signal and power cables 14a, 14b, 14c and 15a, 15b, 15c which connect the AC/DC converters 16 directly to a respective charging interface 13a, 13b, 13c. The AC/DC converters 16 each have an output of 11 kW.

In the present embodiment, a parallel DC charging of a plurality of electric vehicles (not shown) is illustrated. For this purpose, the two AC/DC converters 16 can be connected in parallel or in series by the switching unit 17. The switching unit 17 is also configured to control a charging sequence of the charging of the individual charging interfaces 13a, 13b, 13c.

Figure 4:
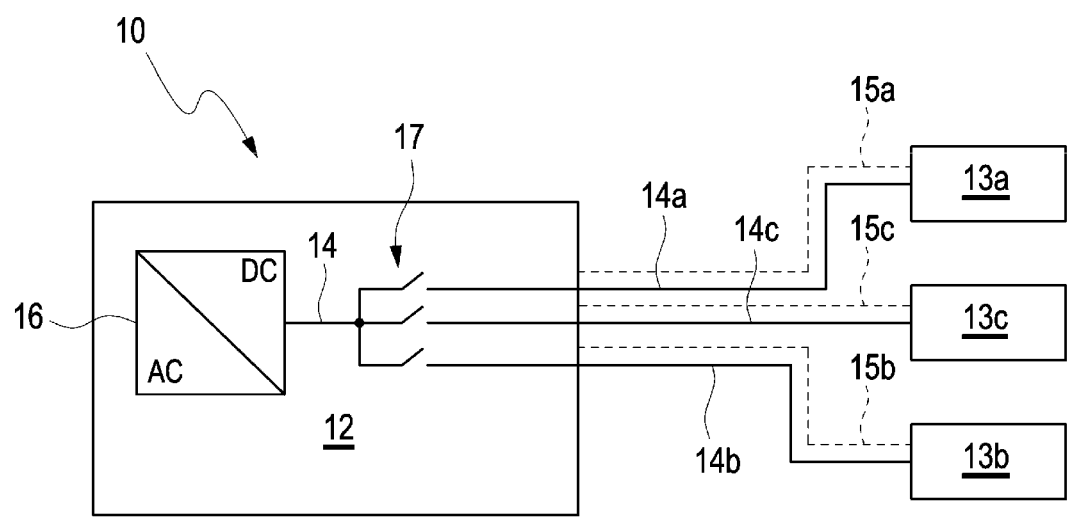
FIG. 4 illustrates a schematic representation of an embodiment of a wallbox system with a DC wallbox and charging interfaces that can be switched on or off.

FIG. 4 shows a schematic representation of an embodiment of the wallbox system 10 with a DC wallbox 10 and charging interfaces 13a, 13b, 13c that can be switched on or off. The DC wallbox 10 comprises an AC/DC converter 16 which has an output of 22 kW. The AC/DC converter is connected to the three charging interfaces 13a, 13b and 13c via a respective power cable 14 which splits into three parallel power cables 14a, 14b, 14c. The power cables 14a, 14b, 14c can each be switched on and off by a switching unit 17. In this case, the wallbox 10 is connected directly to each charging interface 13a, 13b, 13c via three respective signal cables 15a, 15b, 15c. The switching unit 17 is configured to control a charging sequence of the charging of the individual charging interfaces 13a, 13b, 13c.

German patent application no. DE 10 2019 126 266.6, filed Sep. 30, 2019, to which this application claims priority, is hereby incorporated herein by reference in its entirety.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wallbox system for charging electric vehicles, comprising:
   a wallbox, wherein the wallbox includes a charging interface, wherein the charging interface is a socket or a cable outlet with a cable and a plug;
   wherein the wallbox includes a switching unit configured to set or control a charging sequence of the charging interface on the basis of parametrizable logic; and
   wherein the switching unit is configured to sequentially charge electric vehicles connected to the at least one charging interface during an AC charging of the electric vehicles through the wallbox.

2. The wallbox system according to claim 1, wherein the wallbox is formed and arranged in a sub-distribution unit.

3. The wallbox system according to claim 1, wherein the charging interface is connected to a combined signal and power cable, the combined signal and power cable being set up to provide a communication link between the wallbox and the electric vehicles.

4. The wallbox system according to claim 3, wherein the combined signal and power cable is directly connected to the wallbox.

5. The wallbox system according to claim 1, wherein the wallbox comprises at least two charging interfaces which are formed separately from one another.

6. The wallbox system according to claim 5, wherein the wallbox comprises three charging interfaces which are formed separately from one another.

7. The wallbox system according to claim 1, wherein the wallbox comprises at least one direct charging interface.

8. The wallbox system according to claim 1, wherein the switching unit is configured to charge at least two vehicles in parallel during an AC charging of the electric vehicles through the wallbox, wherein the power is distributed to the respective vehicles.

9. A wallbox system for charging electric vehicles, comprising:
a wallbox, wherein the wallbox includes a charging interface, wherein the charging interface is a socket or a cable outlet with a cable and a plug;
wherein the wallbox includes a switching unit configured to set or control a charging sequence of the charging interface on the basis of parametrizable logic;
wherein the switching unit is configured to sequentially charge electric vehicles connected to the at least one charging interface during a DC charging of the electric vehicles through the wallbox.

10. The wallbox system according to claim 9, wherein the wallbox is formed and arranged in a sub-distribution unit.

11. The wallbox system according to claim 9, wherein the charging interface is connected to a combined signal and power cable, the combined signal and power cable being set up to provide a communication link between the wallbox and the electric vehicles.

12. The wallbox system according to claim 11, wherein the combined signal and power cable is directly connected to the wallbox.

13. The wallbox system according to claim 9, wherein the wallbox comprises at least two charging interfaces which are formed separately from one another.

14. The wallbox system according to claim 13, wherein the wallbox comprises three charging interfaces which are formed separately from one another.

15. The wallbox system according to claim 9, wherein the wallbox comprises at least one direct charging interface.

16. The wallbox system according to claim 9, wherein the wallbox is configured to charge at least two vehicles in parallel during a DC charging of the electric vehicles through the wallbox, wherein the power is distributed to the respective vehicles.

* * * * *